(12) United States Patent
Singh et al.

(10) Patent No.: US 11,734,565 B2
(45) Date of Patent: *Aug. 22, 2023

(54) SYSTEMS AND METHODS OF TRAINING NEURAL NETWORKS AGAINST ADVERSARIAL ATTACKS

(71) Applicant: ADOBE INC., San Jose, CA (US)

(72) Inventors: Mayank Singh, Noida (IN); Abhishek Sinha, Noida (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,405

(22) Filed: Jun. 3, 2022

(65) Prior Publication Data
US 2022/0292356 A1 Sep. 15, 2022

Related U.S. Application Data

(63) Continuation of application No. 16/129,553, filed on Sep. 12, 2018, now Pat. No. 11,468,314.

(51) Int. Cl.
*G06N 3/08* (2023.01)
*G06F 21/57* (2013.01)
(Continued)

(52) U.S. Cl.
CPC ............ *G06N 3/08* (2013.01); *G06F 18/214* (2023.01); *G06F 18/24* (2023.01); *G06F 21/577* (2013.01); *G06N 3/048* (2023.01); *G06N 5/046* (2013.01)

(58) Field of Classification Search
CPC ........ G06F 18/214; G06F 18/24; G06F 21/57; G06F 21/577; G06N 3/0464; G06N 3/048;
(Continued)

(56) References Cited

U.S. PATENT DOCUMENTS

2018/0260651 A1* 9/2018 Wang ...................... G06T 7/194
2020/0005133 A1 1/2020 Zhang et al.

OTHER PUBLICATIONS

Qian et al., "L2-Nonexpansive Neural Networks", Mar. 5, 2018, arXiv:1802.07896 , pp. 1-16. (Year: 2018).*
(Continued)

*Primary Examiner* — Brent Johnston Hoover
(74) *Attorney, Agent, or Firm* — Shook, Hardy & Bacon, LLP

(57) ABSTRACT

Embodiments disclosed herein describe systems, methods, and products that generate trained neural networks that are robust against adversarial attacks. During a training phase, an illustrative computer may iteratively optimize a loss function that may include a penalty for ill-conditioned weight matrices in addition to a penalty for classification errors. Therefore, after the training phase, the trained neural network may include one or more well-conditioned weight matrices. The one or more well-conditioned weight matrices may minimize the effect of perturbations within an adversarial input thereby increasing the accuracy of classification of the adversarial input. By contrast, conventional training approaches may merely reduce the classification errors using backpropagation, and, as a result, any perturbation in an input is prone to generate a large effect on the output.

19 Claims, 8 Drawing Sheets

(51) Int. Cl.
*G06N 5/046* (2023.01)
*G06F 18/24* (2023.01)
*G06F 18/214* (2023.01)
*G06N 3/048* (2023.01)

(58) Field of Classification Search
CPC ............ G06N 3/08; G06N 3/084; G06N 3/09;
G06N 3/094; G06N 5/046; G06V 10/82
See application file for complete search history.

(56) References Cited

OTHER PUBLICATIONS

Zuo et al., "Generative Adversarial Forests for Better Conditioned Adversarial Learning", May 14, 2018, arXiv:1805.05185v1, pp. 1-17. (Year: 2018).*
Povey, D., et al., "Semi-Orthogonal Low-Rank Matrix Factorization for Deep Neural Networks", Interspeech, pp. 3743-3747 (2018).
Singh, M., et al., "Neural Networks in Adversarial Setting and Ill-Conditioned Weight Space", arXiv:1801.00905v1, pp. 1-7 (2018).
Qian, H., and Wegman, M., N., "L2-Nonexpansive Neural Networks", arXiv:1802.07896v2, pp. 1-16 (2018).
Zuo, Y., et al., "Generative Adversarial Forests for Better Conditioned Adversarial Learning", arXiv: 1805.05185v1, pp. 1-17 (May 14, 2018).

\* cited by examiner

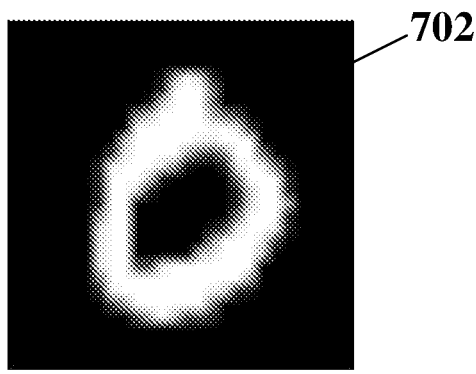
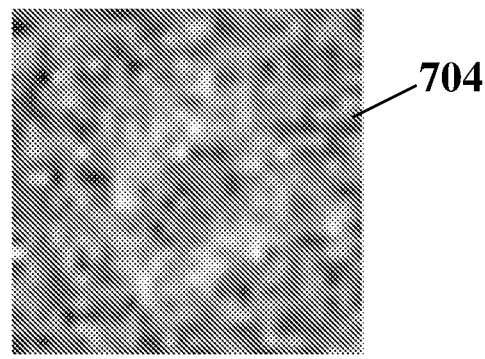
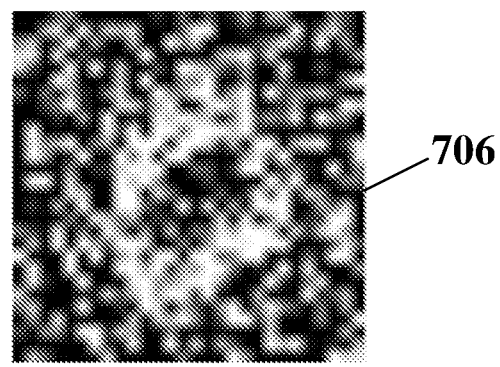
FIG. 7

SYSTEMS AND METHODS OF TRAINING NEURAL NETWORKS AGAINST ADVERSARIAL ATTACKS

CROSS-REFERENCE TO RELATED APPLICATIONS

This application is a Continuation application of U.S. patent application Ser. No. 16/129,553, titled "SYSTEMS AND METHODS OF TRAINING NEURAL NETWORKS AGAINST ADVERSARIAL ATTACKS", filed on Sep. 12, 2018, the contents of which are incorporated herein by reference in their entirety.

TECHNICAL FIELD

This application relates generally to computer-implemented training of neural networks, and more specifically towards training neural networks to be robust against adversarial attacks.

BACKGROUND

Neural networks have recently seen a surge in their adoption because of their accuracy on various tasks. In particular, deep learning models have performed well in several domains, such computer vision, natural language processing, and speech recognition. Deep learning models have achieved a high level of accuracy in the aforementioned domains and hence their recent popularity.

When performing tasks, such as image recognition, natural language comprehension, and speech recognition in noisy environments, machine trained models may be susceptible to a calculated perturbations or noise inserted into the input instances to the models. In other words, neural networks may be susceptible to adversarial attacks, where an attacker may add or insert some calculated noise to an image or audio and cause the neural networks to misclassify the contents of the image or the audio. Humans may naturally recognize an image and audio despite the insertion of the noise. However, the neural networks, trained to recognize certain patterns, may misclassify the image or the audio based upon the patterns within the calculated noise.

For example, FIG. 1A shows an input image 102 containing a photograph of a bird species Indigo bunting. A conventionally trained neural network may identify a likeness of an Indigo bunting in the input image 102 with a reasonable amount of confidence. An attacker may add calculated noise 104 to the input image 102 to generate an adversarial image 106. For a human eye, the adversarial image 106 does not appear to be different from the input image 102 as a result of the calculated noise 104. However, the conventionally trained neural network may misclassify a likeness in the adversarial image 106 as a different bird species European gallinule. As another example, FIG. 1B shows an input image 108 containing a photograph of a school bus, and a conventionally trained neural network may identify a likeness of a school bus in the input image 108. An attacker may add calculated noise 110 to the input image 108 to generate an adversarial image 112. Although there may be no perceptible difference between the input image 108 and the adversarial image 112 to a human eye, the conventionally trained neural network may incorrectly determine that the adversarial image 112 contains a likeness of an ostrich as a result of the calculated noise 110.

The adversarial attacks on neural networks may pose several problems. For example, in a system implementing an image classifier to distinguish between non-offensive and offensive images, an attacker may add a small amount of calculated noise to an offensive image to maliciously cause the image classifier to classify the offensive image as a non-offensive image. As another example, a self-driving car may utilize a neural network to process and classify traffic signs. An attacker may subtly add noise to an image of a stop sign, thereby causing the neural network to classify the stop sign as a speed limit sign. With the ubiquity of neural networks, results of misclassifications by these neural networks may be fatal.

As such, a significant improvement upon neural networks and the training of the neural networks to be more robust against adversarial attacks is required.

SUMMARY

What is therefore desired are systems and methods for training neural networks to be more robust against adversarial attacks. Initially, a training phase for training a neural network may be performed by providing an image with an adversarial attack (e.g., calculated perturbations). During the training phase, a computer executing the neural network may iteratively optimize a loss function that may include a penalty for ill-conditioned weight matrices in addition to a penalty for classification errors. Thereafter, the trained neural network may include one or more well-conditioned weight matrices to minimize the effect of perturbations within an adversarial input, thereby increasing the accuracy of classification of the adversarial input. In contrast, conventional training approaches may merely reduce the classification errors using backpropagation and, as a result, any perturbation in an input is prone to generate a large effect on the output. A system can then use the trained neural network to identify images containing an adversarial attack.

In an embodiment, a system comprises a non-transitory storage medium storing one or more computer instructions and one or more well-conditioned weight matrices forming a neural network, the neural network generated by being trained to optimize a loss function including a penalty for one or more ill-conditioned weight matrices in the neural network to generate the one or more well-conditioned weight matrices; a processor may be coupled to the non-transitory storage medium and configured to execute the computer instructions and to access the one or more well-conditioned weight matrices to: receive an adversarial input file containing an input to be classified with calculated perturbations added to a representation of the input; and classify the input in the adversarial input file by propagating portions of the adversarial input file through a plurality of layers of the neural network while constraining the effect of the calculated perturbations utilizing the one or more well-conditioned weight matrices.

In another embodiment, a computer-implemented method of training a neural network against adversarial attacks comprises initializing, by a computer, a neural network with random values to one or more weight matrices; and iteratively optimizing, by the computer, a loss function by minimizing a penalty for ill-conditioned weight matrices such that the computer generates a trained neural network with one or more well-conditioned weight matrices, whereby the one or more well-conditioned matrices constrain the effect of calculated perturbations added to an input in an adversarial input file.

In yet another embodiment, a non-transitory computer-readable medium contains computer program instructions, which when executed by a processor cause the processor to perform operations comprising: receiving, by the processor, an adversarial input file containing an input to be classified with calculated perturbations added to a representation of the input; deploying, by the processor, a neural network on the adversarial input file, the neural network containing one or more well-conditioned weight matrices, the neural network being trained to optimize a loss function including a penalty for one or more ill-conditioned weight matrices in the neural network to generate the one or more well-conditioned weight matrices; and classifying, by the processor, based upon deploying the neural network, the input in the adversarial input file by propagating portions of the adversarial input file through a plurality of layers of the neural network while constraining the effect of the calculated perturbations by utilizing the one or more well-conditioned weight matrices.

BRIEF DESCRIPTION OF THE DRAWINGS

The accompanying drawings constitute a part of this specification and illustrate embodiments of the subject matter disclosed herein.

FIG. 7 shows an unperturbed image, a perturbed image, and a clipped perturbed image classified by a conventionally trained neural network and a neural network trained using embodiments disclosed herein.

DETAILED DESCRIPTION

Figure 1A:
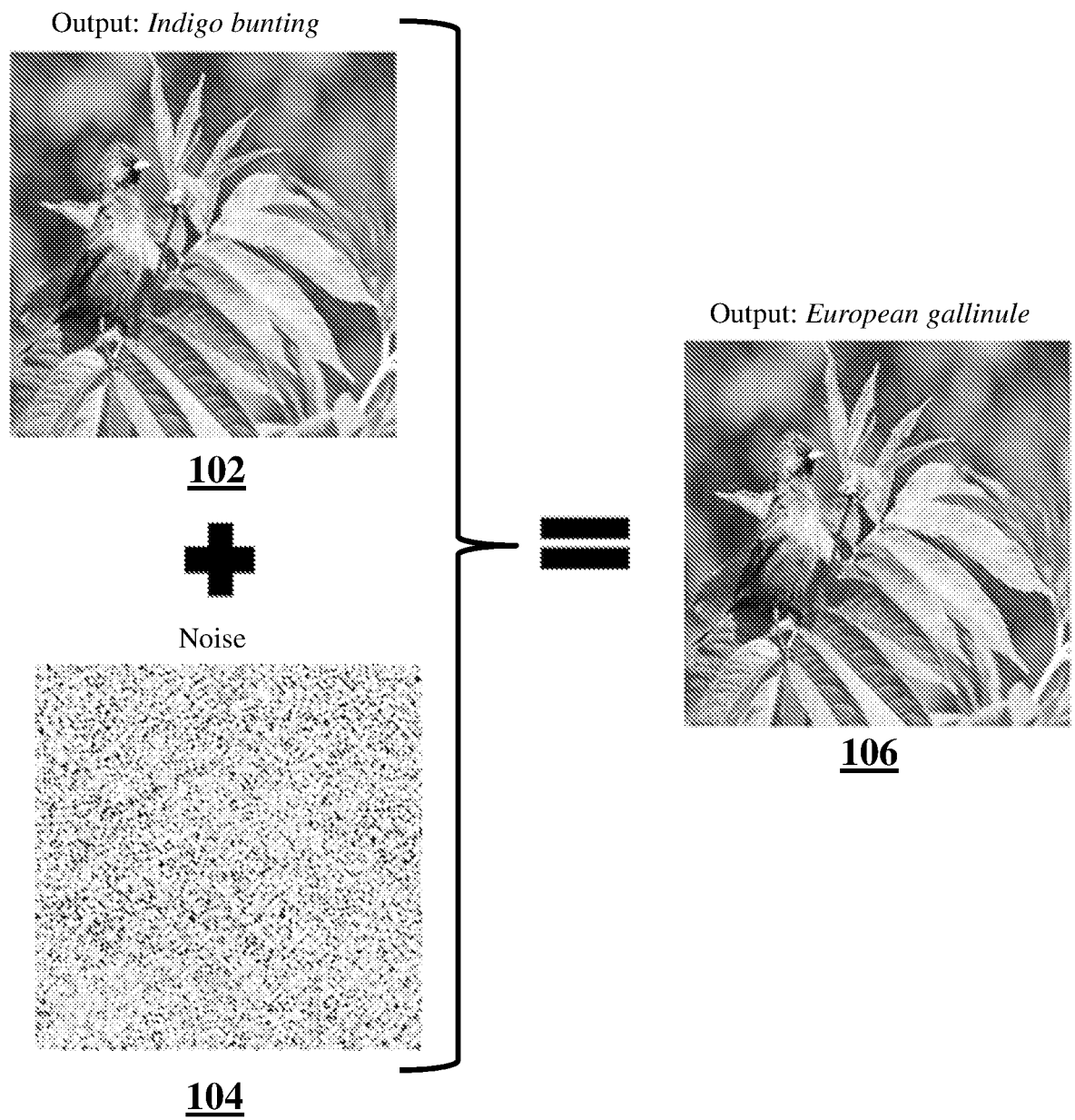
FIGS. 1A-1B show non-adversarial input images, perturbations added to the non-adversarial input images to the non-adversarial input images to generate adversarial input images, and misclassifications of the adversarial input images by a conventionally trained neural network.
Figure 1B:
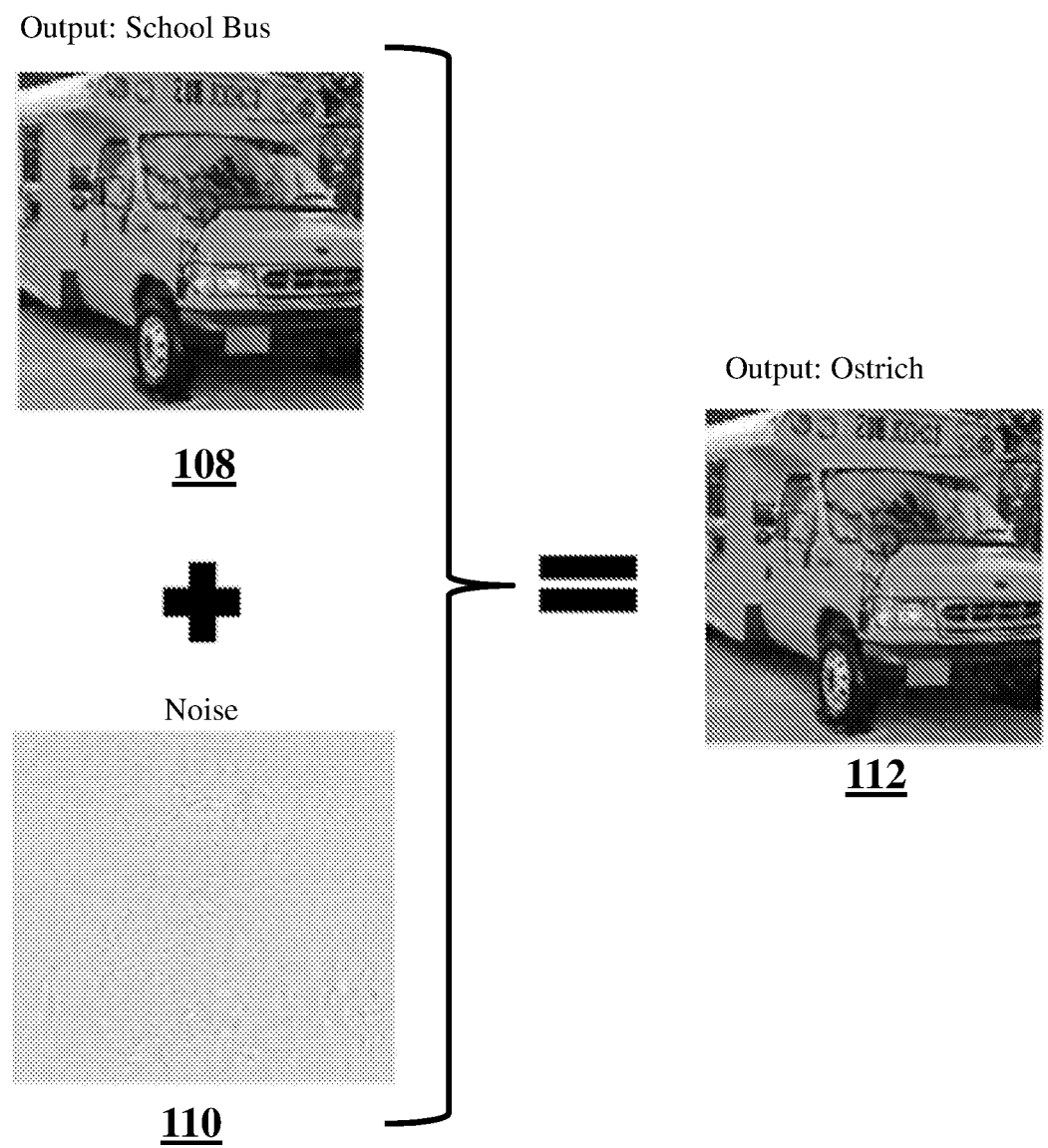

Neural networks have been increasingly popular for tasks, such as computer vision, natural language processing, and speech recognition. Because of this increasing popularity, neural networks also have been attack targets. An attack may cause a neural network to malfunction and/or generate incorrect results. A common form of attack is an adversarial attack, where the attacker inserts a calculated noise to the input data such that the neural network misclassifies/misidentifies the input data based on the patterns within the calculated noise. Within the systems deploying neural networks, the effects of such adversarial attacks may be fatal, as detailed in the examples below.

In one example, in a cloud-based image management system where users may upload images for other users to access, a neural network-based classifier may be used to filter out sensitive, profane, and/or nude content. An attacker may upload sensitive content with a calculated noise (adversarial content) to cause the classifier to misclassify the content as non-sensitive.

In another example, the image management system may use a neural network-based image tagger to generate tags based on the image content, such as a "cat" tag for images showing cats and a "dog" tag for images showing dogs. Attackers may upload an adversarial image of a dog and cause the image tagger to tag the image as a cat. In this case, a user searching for images of cat may also be presented with the image of dog incorrectly tagged as a cat, thereby degrading the user experience.

For facial identification and authentication systems using neural networks, an attacker may add a calculated physical distortion on a face, such as a specific makeup, to cause the neural networks to misidentify the face. For self-driving cars with neural networks to identify street signs, adversarial stickers may be physically placed on the stop signs to cause the neural networks to misidentify images of the stop signs. For example, an adversarial sticker placed on a stop sign may cause the neural networks to misidentify the stop sign as a speed limit sign with potentially fatal consequences.

Embodiments disclosed herein describe an improved neural network that is trained to be more robust against adversarial attacks by controlling condition numbers of weight matrices forming the neural network. While training the neural network, a loss function that includes a penalty for ill-conditioned weight matrices between the layers of the neural networks may be defined. By iterative training to minimize the loss function, a computer may generate a trained neural network with well-conditioned weight matrices. The well-conditioned weight matrices may constrain the effect of the perturbations in adversarial attacks as these perturbations propagate through the neural networks.

A neural network may include multiple layers including an input layer to receive input data, hidden layers to perform various intermediate operations, and an output layer to output a classification or an identification of the input data. Successive layers of the neural networks are connected to each other such the results of calculations/operations are propagated forward to successive layers. During the training process, the computer may iteratively modify the weights of these connections based upon the training data. For example, a set of nodes in a first layer of the neural network may be connected to a node in a second layer succeeding the first layer. Each of the connections between the set of nodes in the first layer to the node in the second layer may have a weight indicating the significance of the respective connection. The node in the second layer therefore may receive a weighted sum of the outputs of the set of nodes in the first layer based upon the weight of the connections, where the weighted sum may be biased using a bias factor associated with the node in the second layer. The node in the second layer may be associated with an activation function that may be activated based on the biased weighted sum.

The weights of the connections between the set of nodes in the first layer and the node in the second layer may be expressed as a weight vector associated with the node in the second layers. The weight vectors for all the nodes in the second layer may be combined to generate a weight matrix W between the first and the second layers. The inputs to the second layer (i.e., the outputs of the first layer) may be expressed as an input matrix x to the second layers. The biases associated with the nodes in the second layer may be expressed as a bias matrix b. Therefore, before the activation function of the second layer is applied, the intermediate computations associated with the second layer may be Wx+b=p, where p is provided to the activation function associated with the second layer. The computer may randomly initialize weight matrices and/or the bias matrices and iteratively modify these matrices based on the training data. Conventional training methods may merely modify the individual weights in the weight matrices and/or the bias matrices to reduce classification errors during training. Such training may generate ill-conditioned weight matrices that cause a large fluctuation in the output based on a perturbation in the input. In other words, the adversarial noise added to the input is propagated to the output in a conventionally trained neural network, making it more susceptible to adversarial attacks.

In contrast, systems and methods described herein train neural networks to not only minimize the classification error, but also to minimize condition numbers of the weight matrices for connections between each pair of layers in the neural networks. Using a loss function that includes a penalty for having ill-conditioned matrices, a computer may generate trained neural networks with well-conditioned weight matrices, i.e., weight matrices with lower condition numbers. A well-conditioned weight matrix has a low condition number relative to a desired condition number, whereas an ill-conditioned matrix has a high condition number relative to that desired condition number. Lower condition number of the matrices limits the effect of perturbations of the inputs to the outputs, thereby making the neural networks robust against adversarial attacks without a loss of accuracy for classifying non-adversarial inputs.

Figure 2:
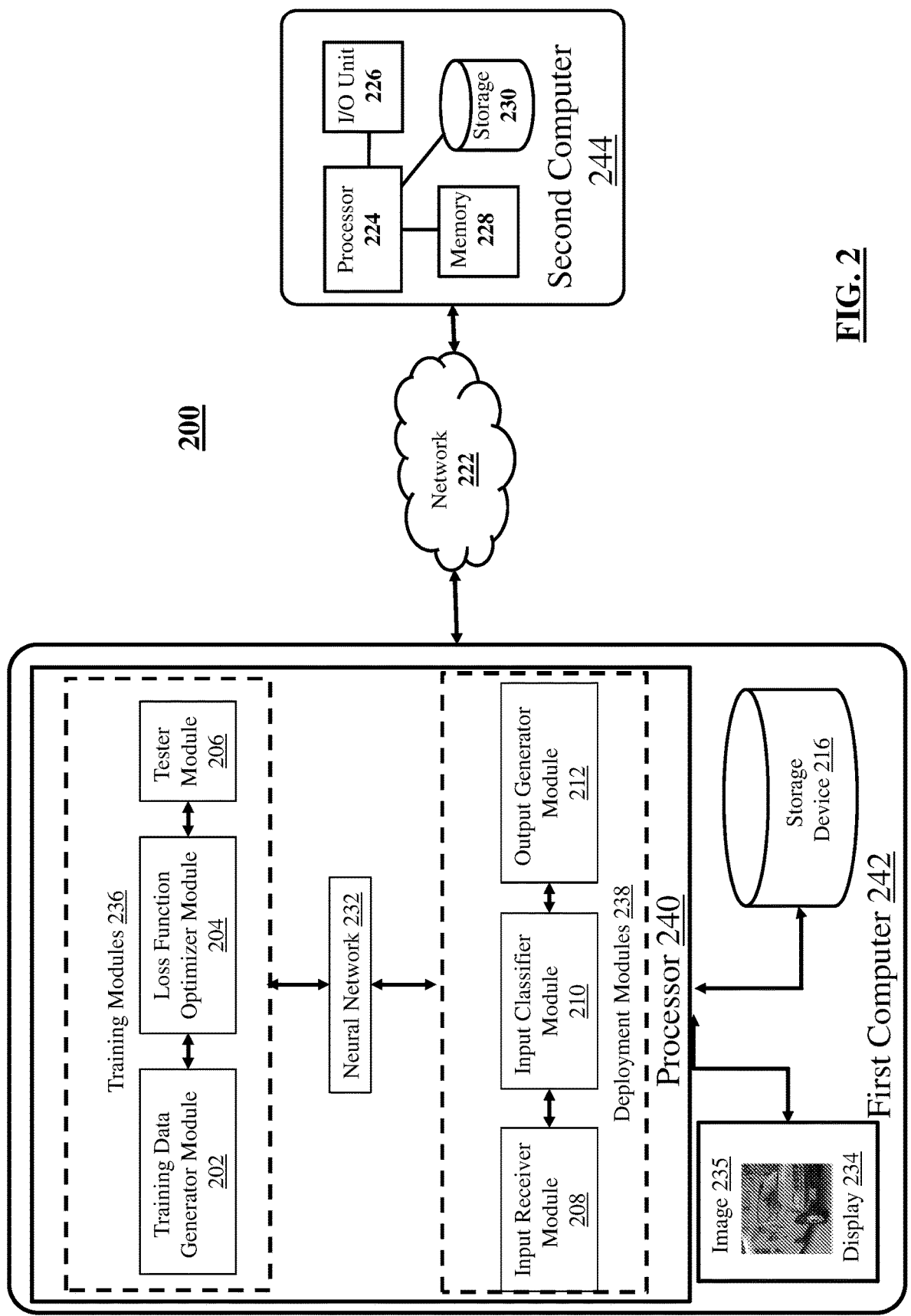
FIG. 2 shows a network environment for training and employing a neural network against adversarial attacks, according to an embodiment.

FIG. 2 shows a network environment 200 for training and/or employing artificial neural networks against adversarial attacks, according to an embodiment. The network environment 200 may comprise a first computer 242 and a second computer 244 interconnected by a network 222. One or more of the first computer 242 and the second computer 244 may be a server computer or a client computer. The functionality described below may be implemented as operations within the first computer 242, operations within the second computer 244, or a combination of operations within the first computer 242 and second computer 244. It should be understood that listed components of the network environment 200 are merely illustrative, and additional, substitute, or lesser number of components should be considered within the scope of this disclosure. For example, the first computer 242 and the second computer 244 may be a personal computer, a laptop computer, a tablet, a smartphone, a mobile phone, or other computing device.

The first computer 242 may include a processor 240, an electronic display 234, and a storage device 216. The processor 240 may include any type of processor that may implement one or more instruction sets to enable the processing functionality of the first computer 242. In particular, the processor 240, as described below, may execute training modules 236 to train a neural network 232 and execute deployment modules 238 to deploy (or utilize) the trained neural network 232 to classify one or more inputs. The storage device 216 may be any type of electronic storage, such as a hard drive, to store software modules (e.g., the training modules 236 and the deployment modules 238) used by the processor 240 to train and/or employ the neural network 232 against adversarial attacks. The electronic display 234 may display one or more inputs and/or one or more inputs to the neural network 232.

The network 222 may be any type of network implementing one or more communication protocols between the first computer 242 and the second computer 244. Examples of the network 222 include, but are not limited to, Local Area Network (LAN), Desk Area Network (DAN), Wireless Local Area Network (WLAN), Metropolitan Area Network (MAN), Wide Area Network (WAN), and the Internet. The communication over the network 222 may be performed in accordance with the one or more communication protocols, such as Transmission Control Protocol and Internet Protocol (TCP/IP), User Datagram Protocol (UDP), and IEEE communication protocols.

The second computer 244 includes a processor 224, an I/O unit 226, a memory 228, and a storage 228. The processor 224 may include any type of processor that may implement one or more instruction sets to enable the processing functionality of the second computer 244. The I/O unit 226 may communicate with the first computer 242 and/or other computers through the network 222. The storage 230 may store software modules (similar to the training modules 236 and the deployment modules 238) for training and/or deploying neural networks (similar to the neural network 232) against adversarial attacks.

As described above, the processor 240 may execute the training modules 236 to train the neural network 232 execute the deployment modules 232 to deploy (or utilize) the neural network 232. The training modules 236 may include a training data generator module 202, a loss function optimizer module 204, and a tester module 206. The deployment modules 238 may include an input receiver module 208, an input classifier module 210, and an output generator module 212.

Figure 3:
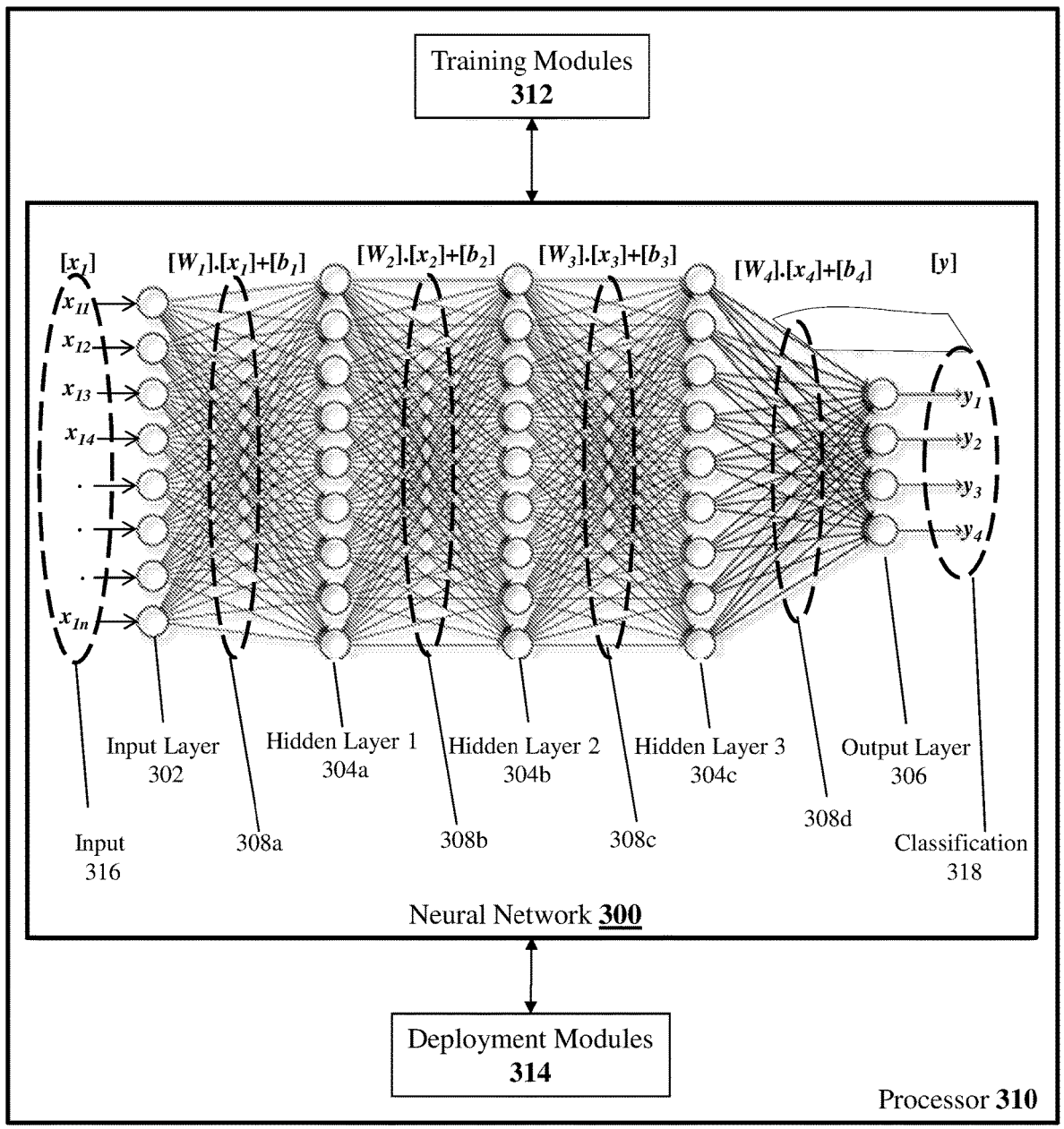
FIG. 3 shows a neural network containing an input layer, hidden layers, an output layer, respective weight matrices for the connections between the layers, according to an embodiment.

The training data generator module 202 may generate and/or receive training data for training the neural network 232 according the embodiments described herein. The training data may include, for example, a first dataset used for training the neural network 232 and a second dataset used for testing the trained neural network 232. In the embodiments with fully-supervised training, the training data may be manually tagged. The loss function optimizer module 204 may iteratively optimize a loss function to train the neural network. In addition to back-propagating classification errors, the loss function optimizer module 204 may also optimize on a penalty for ill-conditioned weight matrices in the neural network. For example, the loss function to be optimized ($L_{total}$) may include a penalty for classification errors ($L_{classification}$) and a penalty for ill-conditioned weight matrices ($L_{cond}$). By iteratively performing closed-loop optimization processes, the loss function optimizer module 204 may generate the trained neural network 232 not only with minimal classification errors, but also with one or more well-conditioned matrices such that the effect of perturbations in the adversarial input is minimized. FIG. 3 shows an illustrative neural network 300, according to an embodiment. The neural network 300 may be similar to the neural network 232 shown in FIG. 2. The neural network may be trained by training modules 312 (similar to the training modules 236 in FIG. 2) and deployed by deployment modules 314 (similar to the deployment modules 238 in FIG. 2), where the training modules 312 and 314 may be executed by a processor 310 (similar to the processor 240 in FIG. 2). The neural network 300 may include an input layer 302, one or more hidden layers 304a, 304b, 304c (collectively referred to as hidden layers 304), and an output layer 306. In some embodiments, the neural network 300 may comprise only the input layer 302 and the output layer 306 without the hidden layers 304. The neural network 300 may be a convolutional neural network (CNN).

Within the neural network 300, the input layer 302 may be connected to a first hidden layer 304a with a first set of connections 308a. Each connection in the first set of connections 308a may be associated with a weight, which may indicate the significance of the connection between a respective node in the input layer 302 and a corresponding node in the first hidden layer 304a. The weights of the connections between the layers may then be represented by a weight matrix. As shown, a weight matrix $W_1$ may include the weights of the first set of connections 308a between the input layer 302 and the first hidden layer 304a. Similarly, weight matrix $W_2$ may include the weights of a second set of connections 308b between the first hidden layer 304a and a second hidden layer 304b. Furthermore, weight matrix $W_3$ may include of the weights of a third set of connections between the second hidden layer 304b and a third hidden layer 304c. Finally, weight matrix $W_3$ may include of the weights of a fourth set of connections 308d between the third hidden layer 304c and the output layer 306. Each node may in the neural network 300 may also be associated with a bias. For a layer, a bias matrix may include the biases of the nodes in the layer. For example, the hidden layers 304a, 304b, 304c and the output layer 306 may be associated with respective bias matrices $b_1$, $b_2$, $b_3$ and $b_4$.

Inputs received by each layer before applying an activation function may therefore be represented as a linear matrix equation. For example, the inputs received by the second hidden layer 304b may be expressed as:

$$W_2 x_2 + b_2$$

These inputs are then provided to an activation function associated with the second hidden layer 304b.

During each of the training phase and deployment phase, the neural network 300 may receive an input 316 and iteratively propagate the input 316 through the input layer 302, hidden layers 304, and the output layer 306 to generate a classification 318 of the input 316.

Figure 4:
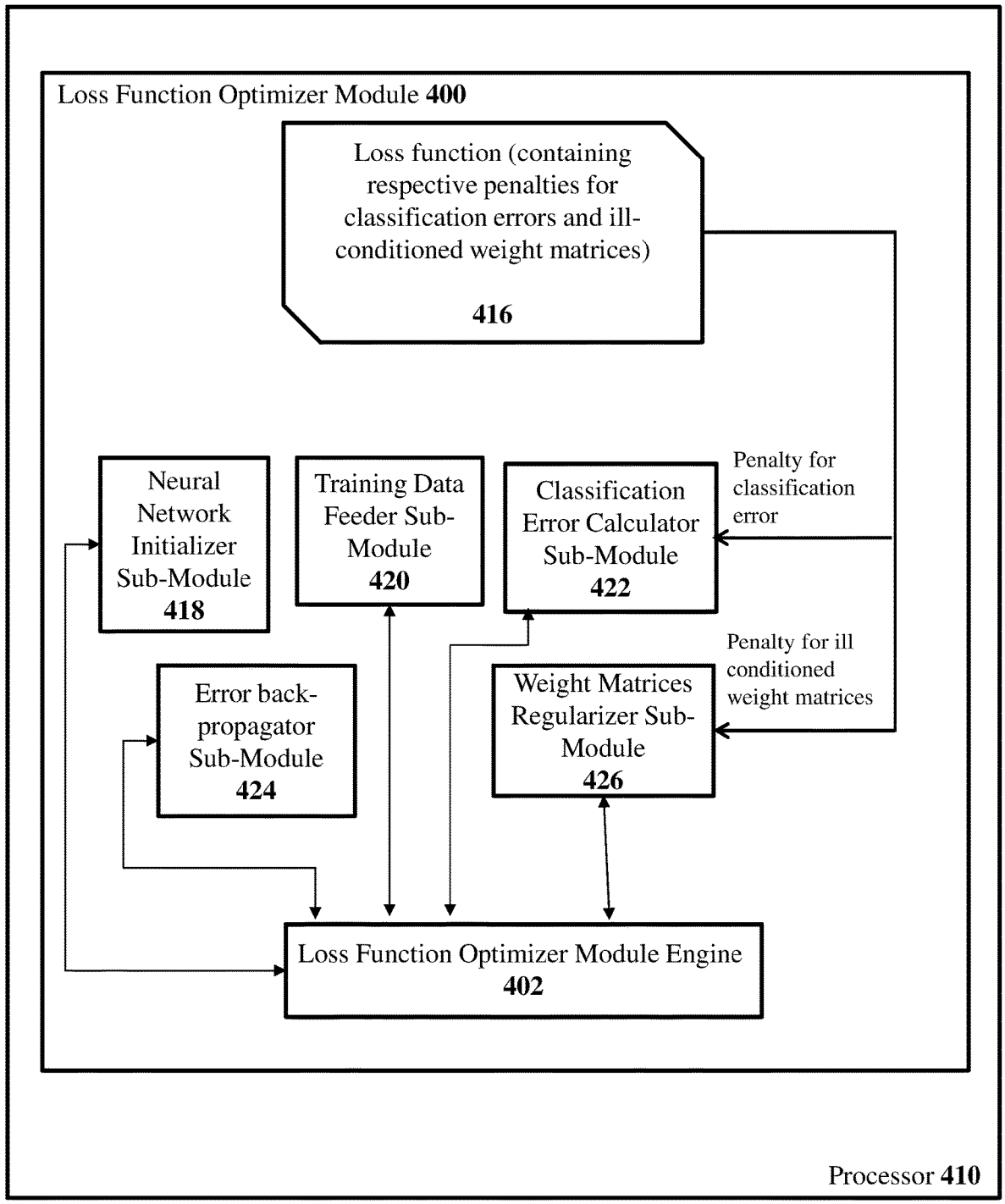
FIG. 4 shows sub-modules of a loss function optimizer module shown in FIG. 2, according to an embodiment.

FIG. 4 is a block diagram showing sub-modules within a loss function optimizer module 400 (similar to the loss function optimizer module 204 in FIG. 2). A processor 410 (similar to the processor 240 in FIG. 2) may execute the loss function optimizer module 400 to a optimize loss function 416. The loss function optimizer module 400 may define the loss function 416. As further described above, the loss function 416 may include a penalty for classification errors ($L_{classification}$) and a penalty for ill-conditioned weight matrices ($L_{cond}$). The loss function optimizer module 400 has a loss function optimizer module engine 402. During training of the neural network, the loss function optimizer module engine 402 may deploy a neural network initializer sub-module 418, a training data feeder sub-module 420, a classification error calculator sub-module 422, an error back-propagator sub-module 424, and a weight matrices regularizer sub-module 426. The neural network initializer sub-module 418 may initialize a neural network by assigning random values to the weight matrices of the neural network. The training data feeder sub-module 420 may feed the training data generated by the training data generator module (shown in FIG. 2 as training data generator module 202) to the neural network being trained. The classification error calculator sub-module 422 may calculate the classification errors of the neural network during the training of the neural network. In other words, the classification error calculator sub-module 422 may determine the differences between correct classifications and the classifications generated by the neural network in training.

To evaluate the loss function 416 during the training of the neural network (e.g., neural network 232 in FIG. 2 and neural network 300 in FIG. 3), the loss function optimizer module 400 may use classification error calculations to calculate the penalty of the classification errors. The error back-propagator sub-module 424 may back-propagate the classification errors to adjust elements in the weight matrices to iteratively improve upon the classifications generated by the neural network in training. The weight matrices regularizer sub-module 426 may control condition numbers of weight matrices of the neural network in training. For example, as the error back-propagation sub-module 424 back-propagates the classification errors, condition numbers of the weight matrices may increase making these weight matrices ill-conditioned. The weight matrices regularizer sub-module 424 may impose an additional training constraint that the condition numbers of the weight matrices have to be kept in a well-conditioned space. As the neural network is being trained, the loss function module 400 may use the condition number of the weight matrices to calculate the penalty for ill-conditioned weight matrices to evaluate the loss function 416.

Continuing with FIG. 2, the tester module 206 may apply the test dataset to the trained neural network to check for classification accuracy of the neural network 232. As described above, the processor 240 may execute the training data generator module 202, the loss function optimizer module 204, and the tester module 206 for training the neural network 232 using the embodiments disclosed herein.

Within the deployment modules 238, the input receiver module 208 may receive one or more inputs to the trained neural network 232. The inputs may be in the form of a file, such as a picture or image file, a video file, a text file, an audio file, and/or any other content, such as sensor data. The files may contain a representation of an input, such as human voices, handwritten texts, a likeness of objects (e.g., animate objects such as cats and dogs and inanimate objects such as desks and benches), either photographed or drawn. In the illustrative embodiment of FIG. 2, an input image 235 is shown in the electronic display 234, but it is understood that the input image may be stored in the storage device 216 and processed by the processor 240, as described herein, without displaying the input image 235 on the electronic display 234. In some instances, the inputs, regardless of the formats, may have adversarial perturbations added to them. The input classifier module 210 may execute the trained neural network 232, which may process the input files to identify/classify the content in the input files. Because of the training using the novel loss function containing a penalty for ill-conditioned weight matrices, the input classifier 210 may be robust against adversarial attacks. The output generator module 212 may output the results generated by the input classifier module 210. As described above, the processor 240 may execute the input receiver module 208, the input classifier module 210, and the output generator module 212 for deploying (also referred to as employing) the trained neural network, trained using the training data generator module 202, the loss function optimizer module 204, and the tester module 206.

The software modules 202, 204, 206, 208, 210, 212 may be stored in a non-transitory storage medium within the network environment 200, such as storage device 216 or other memory (not shown). The non-transitory storage medium may further store one or more computer instructions and one or more well-conditioned weight matrices forming the neural network 232. As described above, the neural network 232 may be trained to optimize a loss function including a penalty for one or more ill-conditioned weight matrices in the neural 232 network to generate the one or more well-conditioned weight matrices. The processors 240 (shown as processor 310 in FIG. 3 and processor 410 in FIG. 4) may be electrically coupled to the non-transitory storage medium. The processor 240 may be programmed execute the computer instructions and access the one or more well-conditioned weight matrices to receive an adversarial input file, which may be a data file, a data stream, or otherwise, containing an item to be classified with calculated perturbations added to a representation of the item. The processor 240 may further be programmed to identify the item in the adversarial input file based upon constraining the effect of the calculated perturbations utilizing the one or more well-conditioned weight matrices.

In an operation, the processor 240 may execute a computer-implemented method that includes initializing the neural network 232 with random values to one or more weight matrices. The method may further iteratively optimize a loss function containing a penalty for ill-conditioned weight matrices such that the processor 314 generates a trained neural network 232 with one or more well-conditioned weight matrices.

In another operation, the processor 240 may execute a computer-implemented method that includes receiving an adversarial input file containing an item to be classified with calculated perturbations added to a representation of the item. The processor 240 may further deploy the neural network 232 on the adversarial input file, where the neural network 232 contains one or more well-conditioned weight matrices, and the neural network 232 is trained to optimize a loss function including a penalty for one or more ill-conditioned weight matrices in the neural network 232 to generate the one or more well-conditioned weight matrices. The processor 240 can identify, based upon deploying the neural network 232, the item in the adversarial input file based upon constraining the effect of the calculated perturbations by utilizing the one or more well-conditioned weight matrices.

It should be understood that the respective functionality of the aforementioned software modules is merely illustrative and similar functionality may be achieved by fewer, more, or different software modules. Furthermore, the software modules described herein may achieve alternative and additional functionality, which should be considered to be within the scope of this disclosure.

Embodiments disclosed herein train the neural network 400 to make the weight matrices well-conditioned, i.e., having a lower condition number. Well-conditioned matrices may limit the effect of perturbations in an adversarial input, thereby making the neural network 400 robust against adversarial attacks.

The functionality of training and/or employing neural networks against adversarial attacks may be implemented by the server 202 and/or the computer 204. The neural networks may be trained and/or employed by the server side processor 208, the client side processor 216, or a combination of operations of the server side processor 208 and the client side processor 216. Regardless of the implementation, one or more of the processors 208, 216 may optimize a loss function containing a penalty for ill-conditioned matrices while training the neural networks.

Figure 5:
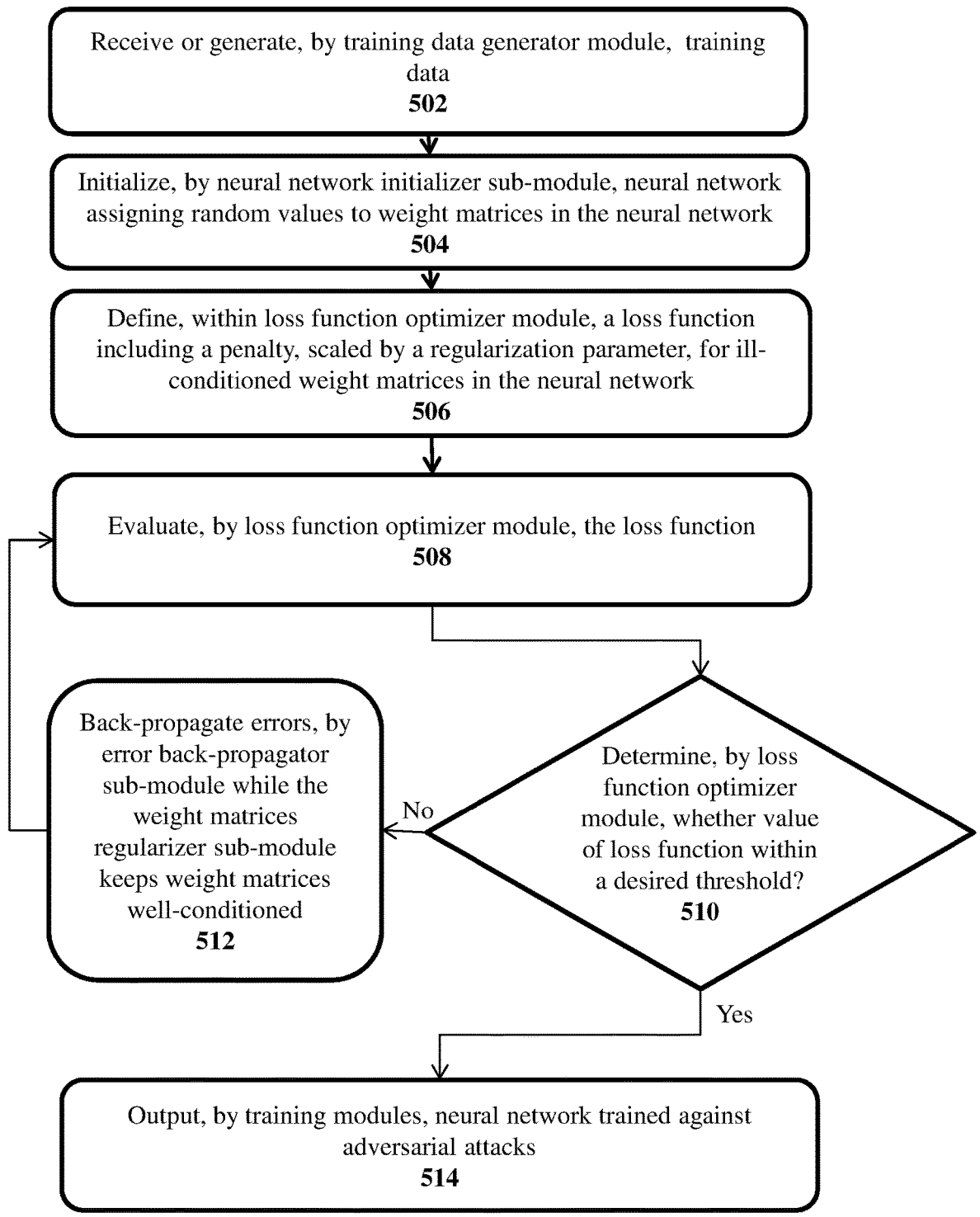
FIG. 5 shows a flow diagram of a method of training a neural network against adversarial attacks, according to an embodiment.

FIG. 5 shows a flow diagram 500 of an illustrative method of training a neural network against adversarial attacks, according to an embodiment. Although multiple computers, multiple software modules, and multiple databases may implement one or more steps of the method, the steps are shown as being implemented by a single computer (such as the first computer 242 in FIG. 2). Furthermore, the steps shown in the flow diagram 500 are merely illustrative, and additional steps or alternative steps should be considered within the scope of this disclosure. Furthermore, one or more of the steps may be skipped during the implementation of the method.

The method may begin at step 502, where the computer may generate or receive training data. The computer may implement a training data generator module (e.g., the training data generator module 202 in FIG. 2) to generate or receive the training data. The training data may be in the form of, for example, audio, video, and/or images. In the embodiments including a supervised training of the neural network, the training data may be manually labeled. At step 504, the computer may initialize the neural network. The computer may execute a neural network initializer sub-module (e.g., the neural network initializer sub-module 418 in FIG. 4). To initialize, the computer may randomly assign weights and biases in the neural network.

At step 506, a loss function including a penalty for ill-conditioned weight matrices in the neural network may be defined within a loss function optimizer module (e.g., the loss function optimizer module 204 in FIG. 2). As described below, the penalty for the ill-conditioned weight matrices may be scaled by a regularization parameter. The computer may optimize (or minimize) the loss function to train the neural network. A condition number of a matrix A, $\kappa(A)$, may be defined as:

$$\kappa(A) = \|A\| \cdot \|A^{-1}\|$$

where the norm of the matrix A, $\|A\|$ may be defined as:

$$\|A\| = \sup_{x\neq 0} \frac{\|Ax\|}{\|x\|}$$

Furthermore, in a system of linear equation:

$$Ax = b$$

an effect of a perturbation of $\delta x$ in x to b, $$A(x+\delta x) = b + \delta b$$

may be described by using a condition number of A, as follows:

$$\frac{\|\delta x\|}{\|x\|} \leq \kappa(A) \frac{\|\delta b\|}{\|b\|}$$

In a fully connected layer of the neural network, the computer may have to perform computations on linear equations, such as:

$$Wx + b = p$$

where W may be a weight matrix, b may be a bias matrix, x may be a matrix of input signals, and p may be an output matrix before passing it through an activation layer. Alternatively, the linear matrix equation above may be represented as, combining b and p.

$$Wx = b_1 => W^{-1} b_1 = x$$

where $b_1 = p - b$. As condition number of the weight matrix W and its inverse $W^{-1}$ may be the same, effect on $b_1$ ($\delta b_1$) of any perturbation in x ($\delta x$) may be represented as $$\frac{\|\delta b_1\|}{\|b_1\|} \leq \kappa(W) \frac{\|\delta x\|}{\|x\|}$$

As adversarial attacks may include input data with malicious perturbation added to the input x to a trained network, e.g., the input being x+δx, improving upon the condition number of the weight matrix W, e.g., κ(W), may limit changes δb₁ in the intermediate output b₁.

The above computation may also be extended to convolutional neural networks by altering a condition number of a matrix with each row including a respective filter's weight optimized by the convolutional neural network. For example, a convolutional neural network may have the parameters ($K_x$, $K_y$, $C_{in}$, $N_f$), where $K_x$ may be the x-dimension of a filter, $K_y$ may be y-dimension of filter, $C_{in}$ may be number of inputs (e.g., number of input channels of an input image), and $N_f$ may be the number of filters used by the conventional neural network. The learnable parameters of the convolutional neural network may be visualized as a matrix having a dimension of (($K_x$*$K_y$*$C_{in}$)*$N_f$). The loss function may therefore be defined to include a penalty for ill-conditioning the aforementioned matrix of the filters, such that the computer may optimize the loss function to train the convolutional neural network.

To define a loss function in a neural network or a convolutional neural network, the computer may include a penalty within the loss function for an ill-conditioned weight matrix (or the filter matrix in the case of a convolutional neural network) as follows:

$$L_{cond} = \lambda(W^T W - I)$$

Here, W may be an $l^2$-normalized weight matrix for the neural network, λ may be a condition loss regularization parameter and I may be an identity matrix of with a dimension of $W^T W$. In other words, to minimize the penalty of $L_{cond}$, the computer may have to make the normalized weight matrix $W^T W$ as close to an orthogonal or semi-orthogonal matrix as possible. Orthogonal matrices have a condition number of 1, thereby being well-conditioned. Semi orthogonal matrices may have lower condition numbers as well. Therefore, for a classification task, the total loss to be optimized may become:

$$L_{total} = L_{classification} + L_{cond}$$

$L_{cond}$ may be different for each layer and the computer may apply a respective $L_{cond}$ for each layer with a different setting of λ, as needed. When the computer optimizes $L_{total}$ for training the neural network, the computer optimizes $L_{cond}$ such that the trained neural network may include well-conditioned matrices.

The computer may select the regularization parameter λ may for each layer based upon condition number of the respective weight matrix during the training. The computer may assign a larger λ to layers having a weight matrices with higher condition numbers and smaller λ to layers having weight matrices with lower condition numbers. For example, in a first iteration, a first layer of the neural network may have a weight matrix with a higher condition number and a second layer of the neural network may have a weight matrix with a lower condition number. In a second subsequent iteration, the computer may assign a higher λ to the first layer and a lower λ to the second layer. It should be understood that λ=0 indicates that $L_{cond}$ is not optimized during training.

At step 508, the computer may iteratively evaluate the loss function to train the neural network. The computer may execute the loss function optimizer module to iteratively evaluate the loss function. In an example iteration, the computer may feed training data into the neural network and determine the classification errors ($L_{classification}$) and the penalty for ill-conditioned matrices ($L_{cond}$) for the iteration. Based on the $L_{classification}$ and $L_{cond}$, the computer may evaluate the total loss function $L_{total}$. At step 510, the computer, by executing the loss function optimizer module, may determine whether the value of the loss function within a desired threshold. It should be understood that the value of the loss function within the desired threshold may indicate that the loss function has been optimized and the neural network has been trained for classification. If the computer determines at step 510 that value of the loss function is not within the desired threshold (i.e., the loss function has not been optimized), the computer may execute step 512.

At step 512, the computer may back-propagate the classification errors to adjust the weights while at the same time ensuring that the condition number of the weight matrices remains low (i.e., keeping the weight matrices well-conditioned). The computer may execute an error back-propagator sub-module (e.g., the error back-propagator sub module 424 in FIG. 4) to back-propagate the classification errors. The computer may execute a weight matrices regularizer sub-module (e.g., the weight matrices regularizer sub-module 426 in FIG. 4) to keep the weight matrices well-conditioned. The computer may iteratively perform the steps 508, 510, 512, until the computer determines that the value of the loss function is within the desired threshold. When the computer determines that the value of the loss function is within the desired threshold, the computer may execute step 514 to output the neural network as a trained neural network. The computer may execute training modules (e.g., training modules 236 in FIG. 2) to output the trained neural network. By being trained to keep the weight matrices well-conditioned, the outputted neural network may be robust against adversarial attacks compared to conventionally-trained neural networks. In some embodiments, the computer may use a portion of the training data as a test data, and use the test data to test the trained neural network. This iterative optimization of the loss function including a penalty for ill-conditioned matrices may also be referred to as a training with an orthogonal regularizer because the training may produce weight matrices that may be closer to orthogonal matrices having a condition number of 1.

Figure 6:
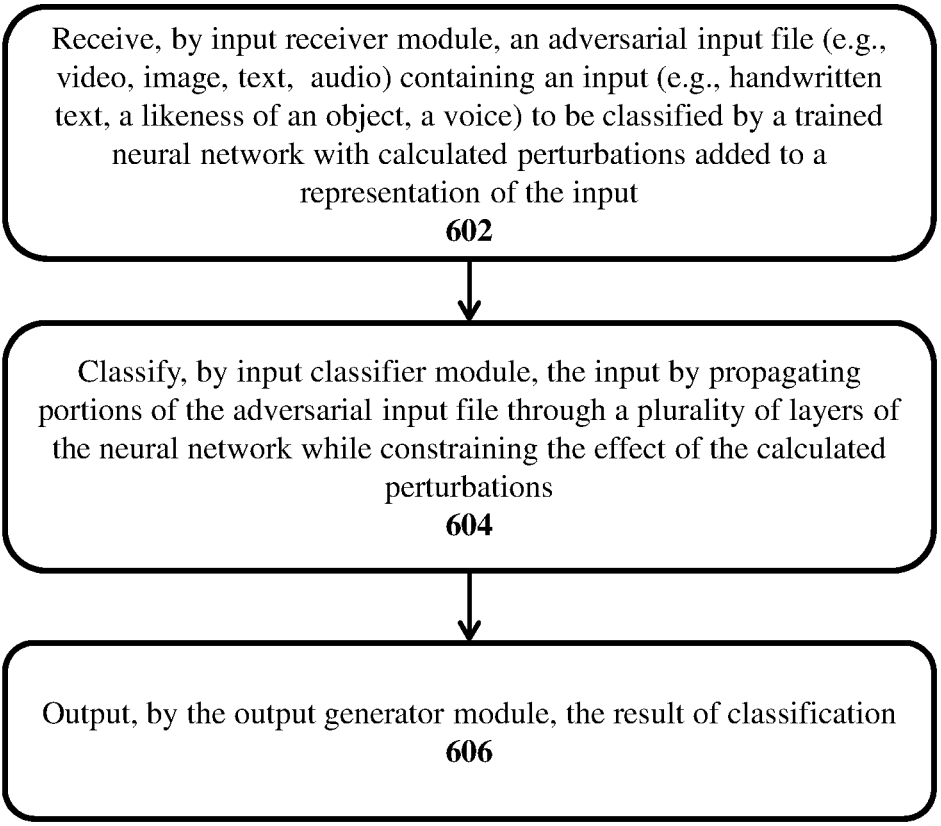
FIG. 6 shows a flow diagram of a method of deploying a neural network against adversarial attacks, according to an embodiment.

FIG. 6 shows a flow diagram 600 of an illustrative method of deploying a neural network against adversarial attacks, according to an embodiment. Although multiple computers, multiple software modules, and multiple databases may implement one or more steps of the method, the steps are shown as being implemented by a single computer (such as the first computer 242 in FIG. 2). Furthermore, the steps shown in the flow diagram 600 are merely illustrative, and additional steps or alternative steps should be considered within the scope of this disclosure. Furthermore, one or more of the steps may be skipped during the implementation of the method.

The method may begin at step 602, where the computer may receive an adversarial input to be classified. The computer may execute an input receiver module (e.g., the input receiver module 208 in FIG. 2) configured to receive the adversarial input to be classified. The input may in the form of file, such as an image file, a video file, a text file, an audio file, and/or any other content, such as sensor data. The input may contain a representation of an input file, such as a human voice, handwritten text, a likeness of an object (e.g., animate objects such as, cats and dogs, and inanimate objects, such as desks and benches), either photographed, drawn, or computer generated. In some embodiments, the input may contain perturbations for an adversarial attack to the neural network. For example, in the instance of an image file, the perturbations may include a calculated noise added to the image. At step 604, the computer may classify the content of the input file using the trained neural network. The computer may execute an input classifier module (e.g., the input classifier module 210 in FIG. 2) to classify the content of the input file. For example, the computer may propagate portions of the input file through multiple layers in the neural network. Each layer, based on the respective inputs, weight matrices, and activation function may activate a subsequent layer. If the input content included adversarial perturbations, the neural network may minimize the effect of the perturbations to the classification result. At step 606, the computer may output the result of the classification. As an output, the computer may display the classification, e.g., "cat" along with the confidence of classification. The computer may execute an output generation module (e.g., the output generator module 212 in FIG. 2) to output (e.g., display, store, or transmit) the result of the classification.

Adversarial attacks on a trained neural network may be based upon a fast gradient sign method (FGSM). In an FGSM attack, an adversarial input may be constructed using the following equation:

$$x^{adv} = x + \epsilon \, \text{sign}(\nabla_x J(\theta, x, y))$$

where $x^{adv}$ may be an adversarial input that is generated using an input x and $\epsilon$ may be a variable reflecting the magnitude of perturbation that is introduced while constructing the adversarial example.

Another adversarial attack on a trained network may be a combination of a random noise (RAND) and FGSM (also referred to as RAND+FGSM attacks). In this type of adversarial attack, a random noise (or perturbation) is added to input x to generate x' as follows:

$$x' = x + \alpha \, \text{sign}(\mathcal{N}(0^d, I^d))$$

FGSM then can be added to x' to generate an adversarial input as follows:

$$x^{adv} = x + (\epsilon - \alpha) \, \text{sign}(\nabla_x J(\theta, x', y))$$

Furthermore, the attacks may be grouped into two categories (i) white box attacks and (ii) black box attacks. In white box attacks, an attacker may have a complete knowledge of the neural network model that was used for training as well as the training data with which the model was trained. The attacker then may use the same model and the same training data to train the (attacker's) model and then generate the adversarial examples used to attack a target neural network. In white box attacks, an attacker may not have knowledge of neural network model used to train for a desired task. The attacker further may not have knowledge of the data used for training. Therefore, to generate adversarial examples, the attacker may have to generate a training data and train a substitute neural network. The attacker may, however, query a target neural network to get labels for the generated training data.

Neural networks with systems and methods disclosed herein generate significantly better results compared to the conventionally trained neural networks. Neural networks trained using the systems and methods described herein were evaluated on FGSM and RAND+FGSM white box attacks and FGSM black box attacks. Results were compared with the results generated from those attacks on conventionally trained neural networks. The results generated by the neural networks trained using the systems and methods described herein were compared with results generated from neural networks with conventional adversarial training. In a conventional adversarial training, a trained neural network is retrained using adversarial training data.

To compare the results from neural networks trained using systems and methods disclosed herein with the results from conventionally trained neural networks with and without adversarial retraining, a convolutional neural network (CNN) with two convolutional layers and two fully connected layers with rectified linear unit (ReLU) activations was generated. The CNN further contained a dropout layer after the first fully connected layer. Max pooling (2*2 pool size and 2*2 stride) was applied after every convolutional layer. The CNN layer weights were of size [5, 5, 1, 32] and [5, 5, 32, 64] respectively and the fully connected layers of the sizes [3136, 1024] and [1024, 10]. All the experiments were conducted using two different datasets: the Modified National Institute of Standards and Technology (MNIST) handwritten dataset and the clothing related Fashion-MNIST (also referred to as F-MNIST) dataset.

For comparison of the results, the CNN was (i) trained using conventional methods, (ii) trained with a regularizer using embodiments disclosed herein, (iii) trained with non-adversarial training data and retrained with adversarial training data, both using conventional methods, and (iv) trained with non-adversarial training data and retrained with adversarial training data with one or more of the training and retraining with orthogonal regularizers using embodiments disclosed herein. In other words, these different trainings generate multiple trained CNNs. As can be seen from the tables below, CNNs trained using embodiments disclosed herein significantly outperforms the conventionally trained CNNs. In other words, classification accuracy of CNNs trained using embodiments disclosed herein is significantly better than conventionally trained CNNs.

For example, TABLE I shows accuracy of classifications (also referred to as adversarial accuracy) by trained CNNs on white-box FGSM adversarial attacks with the MNIST dataset for a (i) normal (conventionally trained) CNN (column 2), (ii) a CNN trained using an orthogonal regularizer (column 3), (iii) a conventionally trained CNN with adversarial retaining (column 4), and (iv) a CNN trained with non-adversarial data and retrained with adversarial data, where one or more trainings were with an orthogonal regularizer (column 5). The epsilon column shows the varying amount of perturbation added to the adversarial inputs.

TABLE I

| Adversarial accuracy for FGSM white box attack over MNIST dataset | | | | |
| --- | --- | --- | --- | --- |
| epsilon | Normal | Regularizer | Adv. train | Adv. Train + Regularizer |
| 0.05 | 0.9486 | 0.9643 | 0.9752 | 0.9768 |
| 0.1 | 0.7912 | 0.8759 | 0.9527 | 0.9556 |
| 0.15 | 0.4804 | 0.6753 | 0.9352 | 0.9678 |
| 0.2 | 0.1903 | 0.3847 | 0.9212 | 0.9714 |
| 0.25 | 0.058 | 0.1484 | 0.9008 | 0.9787 |
| 0.3 | 0.0238 | 0.0276 | 0.8729 | 0.979 |

One can see from TABLE I that CNNs using systems and methods disclosed herein performs significantly better in both cases of training without adversarial retraining and training with adversarial training.

TABLE II shows adversarial accuracy of the CNNs trained using the systems and methods described herein compared to the conventionally trained CNN for a white box FGSM attack over the F-MNIST dataset. The first column shows the varying amount of adversarial perturbation (epsilon) added to the adversarial input data to the CNN. The second column shows adversarial accuracy of a normal (conventionally trained) CNN. The third column shows adversarial accuracy of a CNN with a regularizer using embodiments disclosed herein. The fourth column shows adversarial accuracy of a CNN trained with a non-adversarial dataset and retrained using an adversarial dataset. The fifth column shows adversarial accuracy of CNN trained with a non-adversarial dataset and retrained using an adversarial dataset, where one or more of the training and retraining was with a regularizer using the embodiments disclosed herein. As can be seen in TABLE II, CNNs trained using the regularizer, regardless of adversarial training, significantly outperforms conventionally trained CNNs.

TABLE II

Adversarial accuracy for FGSM white box attack over F-MNIST dataset

| epsilon | Normal | Regularizer | Adv. train | Adv. Train + Regularizer |
|---|---|---|---|---|
| 0.05 | 0.5013 | 0.5559 | 0.7728 | 0.7713 |
| 0.1 | 0.2128 | 0.274 | 0.6926 | 0.7073 |
| 0.15 | 0.0658 | 0.1007 | 0.6261 | 0.6535 |
| 0.2 | 0.01 | 0.0227 | 0.5564 | 0.5862 |
| 0.25 | 0.0026 | 0.0022 | 0.4763 | 0.5071 |
| 0.3 | 0.0004 | 0.0003 | 0.4153 | 0.4454 |

TABLE III shows adversarial accuracy of the CNNs trained using the systems and methods described herein compared to the conventionally trained CNN for a white box RAND+FGSM attack over the MNIST dataset. The first column shows the varying amount of adversarial perturbation (epsilon) added to the adversarial input data to the CNN. The second column shows adversarial accuracy of a normal (conventionally trained) CNN. The third column shows adversarial accuracy of a CNN with a regularizer using embodiments disclosed herein. As can be seen in TABLE III, CNNs trained using the regularizer significantly outperforms conventionally trained CNNs.

TABLE III

Adversarial accuracy for RAND + FGSM white box attack over MNIST dataset

| epsilon | Normal | Regularizer |
|---|---|---|
| 0.05 | 0.9911 | 0.9915 |
| 0.1 | 0.9411 | 0.9587 |
| 0.15 | 0.7582 | 0.8536 |
| 0.2 | 0.4171 | 0.6183 |
| 0.25 | 0.1333 | 0.3186 |
| 0.3 | 0.0379 | 0.09 |

TABLE IV shows adversarial accuracy of the CNNs trained using the systems and methods described herein compared to the conventionally trained CNN for a white box RAND+FGSM attack over the F-MNIST dataset. The first column shows the varying amount of adversarial perturbation (epsilon) added to the adversarial input data to the CNN. The second column shows adversarial accuracy of a normal (conventionally trained) CNN. The third column shows adversarial accuracy of a CNN with a regularizer using embodiments disclosed herein. As can be seen in TABLE IV, CNNs trained using the regularizer significantly outperforms conventionally trained CNNs.

TABLE IV

Adversarial accuracy for RAND + FGSM white box attack over F-MNIST dataset

| epsilon | Normal | Regularizer |
|---|---|---|
| 0.05 | 0.896 | 0.8944 |
| 0.1 | 0.4686 | 0.5223 |
| 0.15 | 0.1879 | 0.2417 |
| 0.2 | 0.05 | 0.0805 |
| 0.25 | 0.0065 | 0.0135 |
| 0.3 | 0.0017 | 0.0008 |

For comparing the adversarial accuracy of black box attacks, a substitute neural network with the following architecture was generated: a fully connected convolutional neural network with 2 hidden units each consisting of 200 hidden units and ReLU activation. The substitute neural network has access to 150 test samples initially. New data was augmented to the 150 test samples via a Jacobian augmentation technique. Adversarial examples were generated using the trained substitute neural network, which were then fed for classification to the CNNs, some of which were conventionally trained and others were trained using the embodiments disclosed herein.

TABLE V shows adversarial accuracy of the CNNs trained using the systems and methods described herein compared to the conventionally trained CNN for a black box FGSM attack over the MNIST dataset. The first column shows the varying amount of adversarial perturbation (epsilon) added to the adversarial input data to the CNN. The second column shows adversarial accuracy of a normal (conventionally trained) CNN. The third column shows adversarial accuracy of a CNN trained with a regularizer using embodiments disclosed herein. As can be seen in TABLE V, CNNs trained using the regularizer significantly outperforms conventionally trained CNNs.

TABLE V

Adversarial accuracy for FGSM black box attack over MNIST dataset

| epsilon | Normal | Regularizer |
|---|---|---|
| 0.05 | 0.9879 | 0.9887 |
| 0.1 | 0.9817 | 0.984 |
| 0.15 | 0.9686 | 0.9765 |
| 0.2 | 0.9481 | 0.9624 |
| 0.25 | 0.9076 | 0.9359 |
| 0.3 | 0.8256 | 0.8752 |

TABLE VI shows adversarial accuracy of the CNNs trained using the systems and methods described herein compared to the conventionally trained CNN for a black box FGSM attack over the F-MNIST dataset. The first column shows the varying amount of adversarial perturbation (epsilon) added to the adversarial input data to the CNN. The second column shows adversarial accuracy of a normal (conventionally trained) CNN. The third column shows adversarial accuracy of a CNN trained with a regularizer using embodiments disclosed herein. As can be seen in TABLE VI, CNNs trained using the regularizer significantly outperforms conventionally trained CNNs.

TABLE VI

Adversarial accuracy for FGSM black box attack over F-MNIST dataset

| epsilon | Normal | Regularizer |
|---|---|---|
| 0.05 | 0.8565 | 0.8667 |
| 0.1 | 0.7858 | 0.8161 |
| 0.15 | 0.6924 | 0.7456 |
| 0.2 | 0.577 | 0.6453 |
| 0.25 | 0.459 | 0.5328 |
| 0.3 | 0.3505 | 0.4319 |

TABLE VII shows maximum condition numbers (calculated using matrix 2-norm) of the weight matrices of the CNN. The second and the fourth column show the maximum condition number of the weight matrices for the conventionally trained CNN. The third and the fifth column show maximum condition number of weight matrices of the CNN trained using the embodiments disclosed herein. As seen, the embodiments disclosed herein generate well-conditioned weight matrices with significantly low condition numbers.

TABLE VII

Max condition number of weight matrices

| Dataset | Normal | Regularizer | Adv. train | Adv. Train + Regularizer |
|---|---|---|---|---|
| MNIST | 17.56 | 3.73 | 121.78 | 23.49 |
| FMNIST | 15.94 | 5.63 | 114.30 | 23.14 |

Furthermore, neural networks trained using embodiments disclosed herein do not sacrifice normal (non-adversarial) accuracy for a better adversarial accuracy. TABLE VIII shows normal accuracy for the conventionally trained CNN and the CNN trained using embodiments disclosed herein. More particularly, the second column and the fourth column show the normal classification accuracy for the conventionally trained CNN, and the third and fifth column show the normal classification accuracy for the CNN trained using embodiments disclosed herein. As can be seen in TABLE VIII, the normal classification accuracy of the conventionally trained CNN and the normal classification accuracy of the CNN trained using the embodiments disclosed herein are comparable.

TABLE VIII

Normal accuracy of network under different settings

| Dataset | Normal | Regularizer | Adv. train | Adv. Train + Regularizer |
|---|---|---|---|---|
| MNIST | 0.9916 | 0.9916 | 0.9917 | 0.9907 |
| FMNIST | 0.9038 | 0.9016 | 0.8892 | 0.8852 |

Embodiments above show that reducing condition number of weight matrices via forcing the weight matrices to align orthogonally (i.e., have lower condition numbers) helps in performance adversarial examples. Furthermore, there may be additional issues due to high condition number of the weight matrices. In case of 2-norm, the condition number of a matrix becomes the ratio of largest to smallest singular value. Consider a square matrix A of n dimension having a singular value decomposition (SVD) as $A=U\Sigma V^T$. Rewriting the SVD of A as a combination of n equations, where $i \in \{1, 2, \ldots n\}$, results in:

$$Av_i = \sigma_{n_i} u_i$$

The condition number of the matrix may then be expressed as:

$$\kappa(A) = \frac{\sigma_1}{\sigma_n}$$

If the matrix A is ill-conditioned, then one of the following is the case: (i) $\sigma_1$ is high, (ii) $\sigma_n$ is low, or (iii) both (i) and (ii). From the above equations, one can observe that perturbing the input in the direction of $v_n$ and applying the perturbed input to A produces least amount of change in the output. In fact, $v_n$ forms the least square solution of Ax=0. Hence, in an ill-conditioned weight matrix of neural network with sufficiently low value of $\sigma_n$, perturbing the input in the direction of right singular vector $v_n$ produced minimum change magnitude-wise when applied over the matrix.

$$A(x+\lambda v_n) = Ax + \lambda(\sigma_n u_n)$$

Leveraging this observation in a fully connected neural network, data points which were significantly different from the original data point taken from MNIST dataset were generated by keeping a reasonably high value of λ. The model was still predicting the generated data points to be the same class as that of the original data point. These artificially generated data points can be considered as types of adversarial examples that are visibly different from the original data points, but conventionally trained neural network models classify these data points to have the same class with high confidence.

For example, FIG. 7 shows an original (non-adversarial) test sample image 702 containing "0," which a conventionally trained neural network and/or a neural network trained using embodiments herein may classify correctly with a confidence of 0.999. However, the conventionally trained neural network classified an unclipped perturbed test sample image 704 in the direction of a minimum eigenvector with λ=20 as "0" with a confidence of 0.999. One can see that the unclipped perturbed test sample image 704 is unreadable and classification with such high confidence not a correct classification. In contrast, neural networks trained using embodiments disclosed herein classified the unclipped perturbed test sample image 704 as "0" with a confidence level of 0.105. The low confidence level of classification indicates that the neural networks trained using embodiments disclosed herein generate significantly better classification results because the unclipped perturbed test sample image 704 is unreadable. For a clipped (between 0 and 1) perturbed test image sample 706 in the direction of the minimum eigenvector with λ=20, the conventionally trained neural network generated a classification of "0" with a high confidence level of 0.916. On the contrary, neural network trained using embodiments disclosed herein generated a classification of "0" with a significantly lower confidence level of 0.454. Therefore, one can see that the neural networks trained using the embodiments herein are significantly better classifiers than conventionally trained neural networks.

Embodiments disclosed herein therefore may generate and deploy a neural network that is robust against adversarial inputs. For example, a neural network trained using the embodiments may correctly classify/identify a "stop" traffic sign even in the presence of adversarial stickers pasted on the sign.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a memory component; and
one or more processing devices coupled to the memory component, the one or more processing devices to perform operations comprising:
training a neural network to optimize a loss function to generate one or more well-conditioned weight matrices, the loss function comprising a first penalty for classification errors and a second penalty based on a condition number of weight matrices of the neural network; and
while training, classifying input of an adversarial input file by propagating portions of the adversarial input file through the neural network while constraining an effect of calculated perturbations added to the adversarial input file by utilizing the weight matrices of the neural network.

2. The system of claim 1, the operations further comprising:
constraining the condition number based on evaluating the loss function.

3. The system of claim 1, wherein the adversarial input file comprises at least one of: a video file, an image file, a text file, and an audio file.

4. The system of claim 1, wherein the input to be classified comprises at least one of one of a handwritten text, a likeness of an object, and a voice.

5. The system of claim 1, the operations further comprising:
optimizing the loss function by minimizing the condition number of the weight matrices for connections between one or more pairs of layers in the neural network.

6. The system of claim 1, the operations further comprising:
   while training, calculating the second penalty using the condition number of the weight matrices.

7. The system of claim 1, the operations further comprising:
   outputting the neural network as a trained neural network based on a determination that a value of the loss function is within a desired threshold.

8. The system of claim 1, the operations further comprising:
   iteratively optimizing the loss function by modifying a weight matrix of at least one ill-conditioned weight matrix of the neural network.

9. A system comprising:
   a memory component; and
   one or more processing devices coupled to the memory component, the one or more processing devices to perform operations comprising:
      receiving, by the one or more processing devices, an input file that comprises an input to be classified;
      processing the input in the input file by propagating portions of the input file through a neural network, wherein the neural network is trained based on a loss function that comprises a first penalty for classification errors and a second penalty based on a condition number of weight matrices of the neural network; and
      generating an output comprising a classification of the input.

10. The system of claim 9, the operations further comprising:
    while processing the input to generate the output, constraining at least one perturbation in the input file with the neural network.

11. The system of claim 9, the operations further comprising:
    classifying at least one item in the input file by constraining an effect of a perturbation in the input file utilizing the weight matrices of the neural network.

12. The system of claim 9, wherein the input file comprises one or more of image data, video data, text data, and audio data.

13. A method comprising:
    with one or more processing devices:
       feeding training data to a neural network;
       using the training data, training the neural network to optimize a loss function to generate one or more well-conditioned weight matrices, the loss function comprising a first penalty for classification errors and a second penalty based on a condition number of weight matrices of the neural network; and
       while training:
          classifying input of the training data by propagating portions of the training data through the neural network; and
          adjusting elements in the weight matrices by back-propagating at least one classification error while constraining an effect of at least one calculated perturbation added to the training data.

14. The method of claim 13, further comprising:
    calculating the second penalty based on the condition number of weight matrices.

15. The method of claim 13, wherein the training data comprises at least one of a video file, an image file, a text file, and an audio file.

16. The method of claim 13, further comprising:
    while training, calculating the second penalty using the condition number of the weight matrices.

17. The method of claim 13, further comprising:
    optimizing the loss function by minimizing the condition number of the weight matrices for connections between one or more pairs of layers in the neural network.

18. The method of claim 13, further comprising:
    outputting the neural network as a trained neural network based on a determination that a value of the loss function is within a desired threshold.

19. The method of claim 13, further comprising:
    initializing the neural network training the neural network with the training data.

* * * * *